(12) United States Patent
Torres et al.

(10) Patent No.: US 7,020,286 B2
(45) Date of Patent: Mar. 28, 2006

(54) MODULATION OF DYNAMICAL SYSTEMS FOR COMMUNICATION

(75) Inventors: Wade P. Torres, Providence, RI (US); Alan V. Oppenheim, Lexington, MA (US); Rodolfo R. Rosales, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 752 days.

(21) Appl. No.: 10/077,542

(22) Filed: Feb. 15, 2002

(65) Prior Publication Data

US 2002/0154706 A1 Oct. 24, 2002

Related U.S. Application Data

(60) Provisional application No. 60/269,052, filed on Feb. 15, 2001.

(51) Int. Cl.
*H04N 7/167* (2006.01)
*H04L 9/00* (2006.01)

(52) U.S. Cl. ............... 380/238; 380/236; 713/200; 713/201

(58) Field of Classification Search ............ 380/238, 380/236; 713/200, 201
See application file for complete search history.

(56) References Cited

U.S. PATENT DOCUMENTS 5,402,334 A 3/1995 Pecora et al.

OTHER PUBLICATIONS

"Synchronization of Lorenz-Based Chaotic Circuits with Applications to Communications," Cuomo et al. IEEE Transactions on Circuits and Systems. Oct. 1993. vol. 40, No. 10.
"Multi-User Communication using Chaotic Frequency Modulation," Volkovskii et al. IEEE Transactions on Circuits and Systems. 2001.
"Synchronization and Communication Using Chaotic Frequency Modulation," Volkovskii et al. Institute for Nonlinear Science. Mar. 23, 1999.
"Current Problems for the Transmission of Information Using a Chaotic Signal," Martin Hasler. Swiss Federal Institute of Technology. 1997.

*Primary Examiner*—Thomas R. Peeso
(74) *Attorney, Agent, or Firm*—Gauthier & Connors LLP

(57) ABSTRACT

A system for modulating and demodulating signals that provides a new class of signal modulators and their corresponding demodulators. The modulation scheme embeds in an information signal a carrier signal by modulating the oscillatory rate of the carrier signal. The invention generalizes the possible carrier signals to any signal which can be generated by a dynamical system that have a known exponentially convergent observer, as in certain chaotic systems.

9 Claims, 6 Drawing Sheets

| COMPONENT | VALUE | COMPONENT | VALUE | COMPONENT | VALUE |
|---|---|---|---|---|---|
| R101 | 10kΩ | R102 | 10kΩ | R103 | 10kΩ |
| R104 | 10kΩ | R105 | 681kΩ | R106 | 47.5kΩ |
| R107 | 15.4kΩ | R108 | 47.5kΩ | R109 | 33.2kΩ |
| R110 | 12.1kΩ | R111 | 15.4kΩ | R112 | 100kΩ |
| R113 | 20kΩ | R114 | 2.49kΩ | R115 | 12.4kΩ |
| R116 | 1.74kΩ | R117 | 8.87kΩ | R118 | 3.57kΩ |
| R119 | 17.8kΩ | R120 | 15kΩ | R121 | 15kΩ |
| R201 | 10kΩ | R202 | 10kΩ | R203 | 10kΩ |
| R204 | 10kΩ | R205 | 681kΩ | R206 | 47.5kΩ |
| R207 | 15.4kΩ | R208 | 47.5kΩ | R209 | 33.2kΩ |
| R210 | 12.1kΩ | R211 | 15.4kΩ | R212 | 100kΩ |
| R213 | 20kΩ | R214 | 1.74kΩ | R215 | 8.87kΩ |
| R216 | 3.57kΩ | R217 | 17.8kΩ | R218 | 15kΩ |
| R219 | 15kΩ | | | | |
| R301 | 4.64kΩ | R302 | 4.64kΩ | R303 | 5kΩ |
| R304 | 5kΩ | R305 | 10kΩ | R306 | 10kΩ |
| R307 | 1kΩ | R308 | 4.64kΩ | R309 | 4.64kΩ |
| C101 | 100pF | C102 | 100pF | C103 | 100pF |
| C201 | 100pF | C202 | 100pF | | |
| C301 | 2.7nF | C302 | 2.7nF | C303 | 1.2nF |

*FIG. 7*

MODULATION OF DYNAMICAL SYSTEMS FOR COMMUNICATION

PRIORITY INFORMATION

This application claims priority from provisional application Ser. No. 60/269,052 filed Feb. 15, 2001.

This invention was made with government support under Grant No. F49620-96-1-0072 awarded by the United States Air Force and Cooperative Agreement No. DAAL01-96-2-0001 awarded by the United States Army. The government has certain rights in the invention.

BACKGROUND OF THE INVENTION

Many approaches have been taken to embed continuous-time information bearing waveforms onto continuous-time carrier waveforms for the purpose of communication. Amplitude modulation (AM) and frequency modulation (FM) are common examples of such approaches to communication. In both AM and FM, the carrier wave is a sinusoidal wave. There is a need in the art for a systematic procedure for constructing continuous-time modulators and their corresponding demodulators using carrier waves that are generated by nonlinear systems that have periodic, almost-periodic, quasi-periodic or chaotic attractors.

SUMMARY OF THE INVENTION

Accordingly, the invention provides a new class of signal modulators and their corresponding demodulators. The modulator embeds into a carrier signal an information signal by modulating the oscillatory rate of the carrier signal in a manner proportional to the information signal. The permissible carrier signals are any signals that can be generated by a nonlinear dynamical system that has a known exponentially convergent observer. modulating the rate at which the non-linear system evolves in a manner proportional to the information signal. The method includes multiplying the information signal by a constant to produce a first signal value. The method further includes adding the first signal value and a nominal rate of evolution of the dynamical system to generate a second signal value. The method further includes providing a feedback path that includes a first and second path, wherein the input to the first path is the integration of a multiplication of the second signal value and output of the second path, and the input of the second path is output of the first path, such that the second path is a first function that defines the non-linear dynamical system, and providing the output of the first path as input to a second function that produces a transmitted signal.

According to another aspect of the invention, a system for demodulating a transmitted modulated carrier signal is provided. The demodulator system includes an observer component that receives as input the transmitted signal and a rate estimate and produces an estimate of the current state of the transmitter. The demodulator system also includes a rate estimator that receives as input the transmitted signal and the estimate of the current state of the transmitter to produce the rate estimate. The observer component and rate estimator are interconnected in a feedback loop arrangement, and as shown below, this arrangement recovers the information signal assuming that the dynamical system possesses a local exponential observability property.

BRIEF DESCRIPTION OF THE DRAWINGS

FIG. 7 is a table illustrating exemplary components of the exemplary modulator and exemplary demodulator circuits 40, 50, and 60.

DETAILED DESCRIPTION OF THE INVENTION

Figure 1:
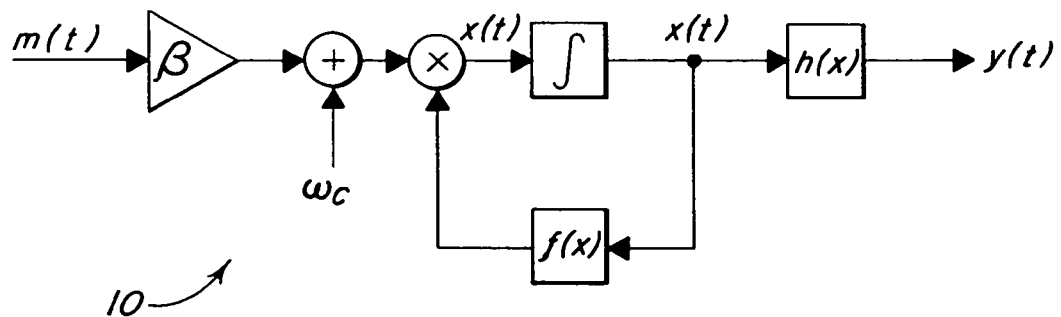
FIG. 1 is a block diagram of the modulator system.

FIG. 1 is a block diagram of the modulator system 10. An information signal m(t) is supplied to a modulating system 10. The modulating system 10 consists of a non-linear system that has a periodic, quasi-periodic, almost periodic, or chaotic attractor. The information signal, m(t), is embedded in the non-linear system 10 by modulating the rate at which the dynamical system evolves. The non-linear dynamically system used to construct the system in 10 is denoted using the notation $$\dot{x}=\omega_c f(x), \tag{1}$$

where x is an N-dimensional vector and $\omega_c$ is a constant. Modulation is achieved by applying the information signal, m(t), to the non-linear dynamical system as $$\dot{x}=(\omega_c+\beta m(t))f(x), \tag{2}$$

where $\omega_c$ is the nominal rate of evolution and $\beta$ is a parameter that characterizes the degree of modulation. The effects of modulation on the non-linear system are readily seen by denoting the solution to the system without modulation giving in (1) as $x_o(t)$. Thus, the addition of modulation as described by (2) results in the modulated signal that can be expressed in term of $x_o(t)$ as $$x(t)=x_0(t+\beta\int_0^t m(\tau)d\tau). \tag{3}$$

Modulating in this fashion does not modify the attractor of the non-linear system. It only modulates the rate at which the dynamical system evolves along the attractor.

Figure 2:
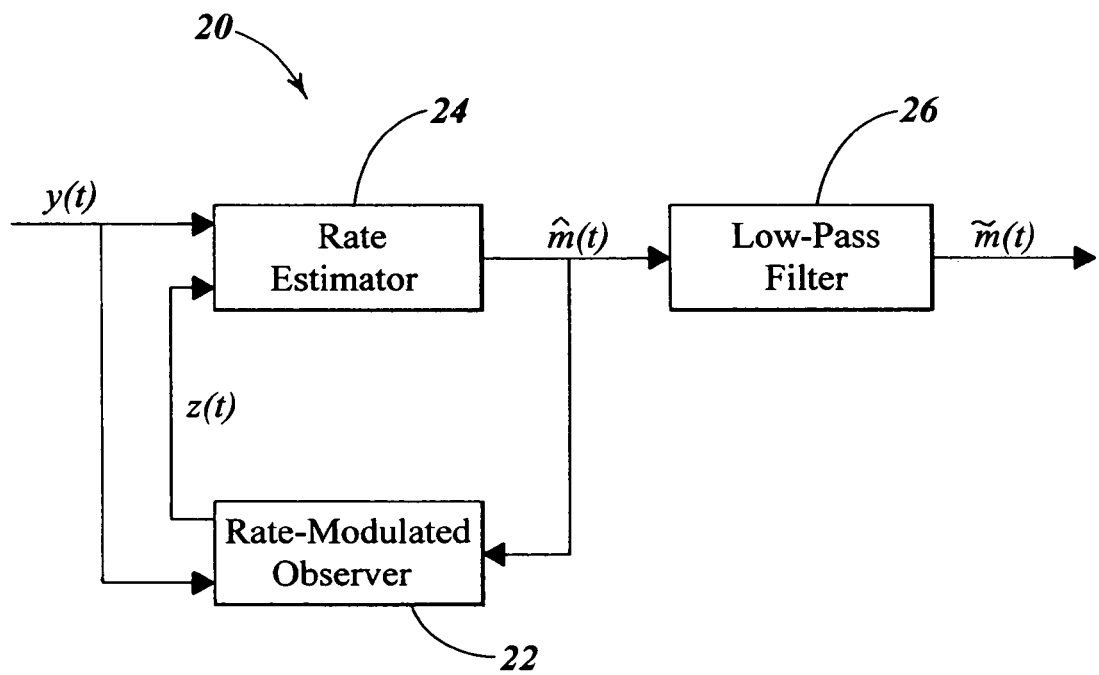
FIG. 2 is a block diagram of the demodulator 20.

The signal that is transmitted to the receiver is a scalar function of the state variables of the non-linear dynamical system in the transmitter. As shown in FIG. 2, y(t) is denoted as $$y(t)=h(x), \tag{4}$$

where h(x) is a function that maps the N-dimensional vector, x, to a one-dimensional signal, y. The complete modulator system is represented mathematically as $$\dot{x}=(\omega_c+\beta m(t))f(x),$$

$$y=h(x), \tag{5}$$

where x is a N-dimensional signal and y is a one-dimensional signal.

FIG. 2 is a block diagram of the demodulator 20. The demodulator 20 must track changes in the rate of evolution of a dynamical system. The demodulator 20 consists of two fundamental components—an observer component 22 and a rate estimator component 24. The observer component 22 reconstructs the state of the demodulator 20, z, given y(t) and the rate estimate, $\hat{m}(t)$. It is assumed assume that the dynamical system without modulation as given in (1) has a known exponentially convergent observer. We define an exponentially convergent observer to be a dynamical system $$\dot{z}=f(z,h(x_0)) \qquad (6)$$

that has the property that $\|z-x_0\| \leq e^{-\lambda t}$ for some $\lambda>0$, where $x_0$ is the solution to the unmodulated dynamical system given in equation (1). The rate estimator estimates m(t) given the state estimate, z, and the transmitted signal, y. The interconnection of these components comprises the complete demodulator system 20. Given the dynamical system is used in modulator system 10, the observer component 24 is given by $$\dot{z}=(\omega_c+\beta\hat{m})f(z,y), \qquad (6)$$

where $\hat{m}$ is the rate estimate. The rate estimator 24 takes as input the reconstructed state z from the observer component 24 and the transmitted signal y(t) and tracks m(t). The low-pass filter 26 removes any spectral energy known to be absent from the original modulating signal, m(t). The low-pass filter 26 is an optional component to the demodulator 20.

Assuming that the unmodulated dynamical system used in modulator 10 has a known exponentially convergent local observer function, the observer component 24 can be modified so that it is an exponentially convergent observer of the modulator 10 when m(t)=$m_0$, where $m_0$ is an unknown constant. If the rate estimator 24 converges to a value of $m_0$, then the augmented observer is assumed to be able to track a time-varying m(t) provided that m(t) varies sufficiently slow.

The design of the rate estimator 24 is based on a technique that is referred to as a backwards perturbation expansion. The essential step in this perturbation expansion is to express the modulator state, x, as a perturbation expansion about the demodulator state, z, in terms of the rate estimate error, $e_m=\hat{m}-m_0$. By expanding the modulator state x as perturbation about the demodulator state z, the resulting expansion terms depend only on variables local to the demodulator 20. The perturbation variables can then be combined in such a way that they force the demodulator rate estimate error to zero. If a dynamical system used in a modulator is of the form $$\dot{x}=f(x),$$

$$y=h(x), \qquad (7)$$

and has an exponentially observer of the form $$\dot{z}=\hat{f}(z,y), \qquad (8)$$

then a modulator as can be constructed as $$\dot{x} = (\omega_c + \beta m(t))f(x),$$
$$y = h(x), \qquad (9)$$

which is similar to the modulator 10 defined in (5) above and a demodulator will be constructed as $$\dot{z} = (\omega_c + \beta\hat{m})\hat{f}(z, y), \qquad (10)$$
$$\hat{y} = h(z),$$
$$\dot{\hat{m}} = K(\hat{y} - y)g\left(\frac{\partial h}{\partial z}(z)\cdot\xi_1\right),$$
$$\dot{\xi}_1 = \left((\omega_c + \beta\hat{m})\frac{\partial\hat{f}}{\partial z}(z, y) + Kr(z, \xi_1)\right)\xi_1 - \beta f(z, y),$$

which is the same as demodulator 20 as defined in (6) where $0<K<K^*$ for some $K^*>0$, and $r(\bullet,\bullet)$ is a scalar valued function defined by $$r(z, \xi_1) = \left(\frac{\partial h}{\partial z}(z)\cdot\xi_1\right)\cdot g\left(\frac{\partial h}{\partial z}(z)\cdot\xi_1\right) \qquad (11)$$

where $g(\bullet)$ is scalar function such that $sgn(g(\alpha))=sgn(\alpha)$, and $$\frac{\|r(z, e_z)\|}{\|e_z\|} < \gamma, \qquad (12)$$

for some $\gamma>0$. The observer 22 and rate estimator 24 are interconnected in a feedback loop as shown in FIG. 3.

Many systems have been shown to possess an exponentially convergent observer, including some chaotic systems. One such system is a chaotic system that is described by the Lorenz equations that are defined as $$\dot{x}_1 = (\sigma(x_2 - x_1)) \qquad (13)$$
$$\dot{x}_2 = (rx_1 - x_1x_3 - x_2)$$
$$\dot{x}_3 = (x_1x_2 - bx_3)$$

where $\sigma$, r, and b are constant parameters. An exponentially convergent observer of the system given in (13) when $y(t)=x_1(t)$, $$\dot{z}_1 = \sigma(z_2 - z_1) \qquad (14)$$
$$\dot{z}_2 = (ry - yz_3 - z_2)$$
$$\dot{z}_3 = (yz_2 - bz_3).$$

Figure 3:
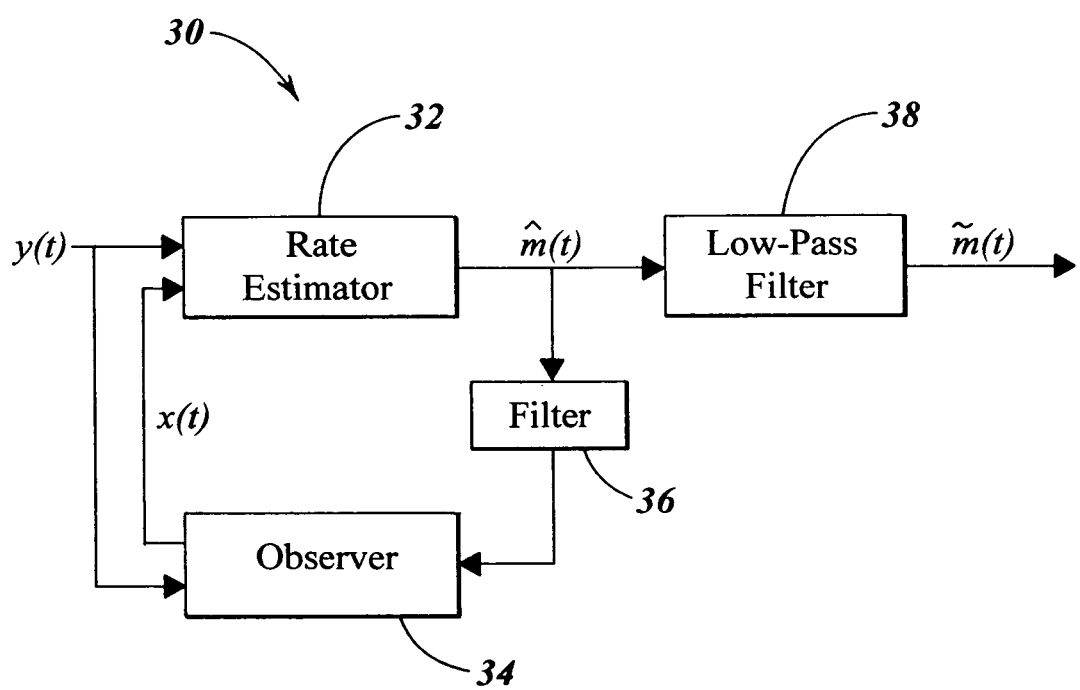
FIG. 3 is a block diagram of the demodulator 30.

FIG. 3 is block diagram of a demodulator 30. Three enhancements have been made to the demodulator 30. First, a low-pass filter 36 is added between the rate estimator 32 and observer 34 to remove spectral energy in $\hat{m}(t)$ that is known to be outside the bandwidth of m(t). Second, K is increased beyond the value for which the perturbation expansion analysis guarantees stability. Although stability is no longer guaranteed, the demodulator 30 may remain stable over a range of $K>K^*$. A larger value for K allows $\hat{m}(t)$ to track faster signals. Finally, many of the nonlinearities in the demodulator 30 are removed by approximating the rate estimator 32 with a linear system. The system that results from the approximation is equivalent to a least-squares approach to designing a demodulator.

To remove the spectral energy in m̂(t) that is outside the bandwidth of m(t), a filter 36 is added to the feedback path. The filtering operation, denoted as <•>, is given by $$<\hat{m}(t)> = \int_0^t \int \psi(t,\tau)\hat{m}(\tau)d\tau, \quad (15)$$

where $\psi(t,\tau)$ is the filter kernel. If the support of this kernel is sufficiently small compared to the rate at which m and m̂ vary, then $$\langle \dot{\hat{m}} \rangle = -K \left\langle \left( \frac{\partial h}{\partial z}(z) \cdot \xi_1 \right) \cdot g \left( \frac{\partial h}{\partial z}(z) \cdot \xi_1 \right) (\hat{m} - m) \right\rangle \quad (16)$$

$$\approx -K \left\langle \left( \frac{\partial h}{\partial z}(z) \cdot \xi_1 \right) \cdot g \left( \frac{\partial h}{\partial z}(z) \cdot \xi_1 \right) \right\rangle (\hat{m} - m).$$

As mentioned above, the gain parameter K had to be smaller than some K* to guarantee that the perturbation expansion was bounded. For K<K*, the rate estimate converges exponentially and monotonically. Choosing K slightly larger than K* affects the demodulator 30 in two ways. First, since K scales the derivate of m̂, increasing K also increases the rate which m̂ can vary, allowing m̂ to track signals that vary more rapidly. Second, the perturbation term may not remain bounded. Returning to the equation for the perturbation variable, $$\dot{\xi}_1 = (\omega_c + \beta\hat{m}) \left\{ \frac{\partial \hat{f}}{\partial z}(z, y) + Kr(z, \xi_1) \right\} \xi_1 - \beta f(z, y), \quad (17)$$

where $$r(z, \xi_1) = \left( \frac{\partial h}{\partial z}(z) \cdot \xi_1 \right) \cdot g \left( \frac{\partial h}{\partial z}(z) \cdot \xi_1 \right). \quad (18)$$

If K is set to zero in (18), $\xi_1$ remains bounded. However, the dynamics of demodulator 30 is changed and convergence is no longer guaranteed, demodulator 30 may be stable for a range of K>K*.

An example, consider the Lorenz based modulation/demodulation system based on the systems described in (13) and (14) with K>K*. The term $Kr(z,\xi_1)$ is dropped from (17) and the demodulator equation for the Lorenz equation becomes $$\dot{z}_1 = (\omega_c + \beta\hat{m})(\sigma(z_2 - z_1)) \quad (19)$$
$$\dot{z}_2 = (\omega_c + \beta\hat{m})(ry - yz_3 - z_2)$$
$$\dot{z}_3 = (\omega_c + \beta\hat{m})(yz_2 - bz_3).$$
$$\dot{\hat{m}} = K(z_1 - y)sgn(\psi_1),$$

-continued $$\begin{bmatrix} \dot{\psi}_1 \\ \dot{\psi}_2 \\ \dot{\psi}_3 \end{bmatrix} = (\omega_c + \beta\hat{m}) \begin{bmatrix} \sigma & \sigma & 0 \\ 0 & -1 & -y \\ 0 & y & -b \end{bmatrix} \begin{bmatrix} \psi_1 \\ \psi_2 \\ \psi_3 \end{bmatrix} - \beta \begin{bmatrix} \sigma(z_2 - z_1) \\ ry - yz_3 - z_2 \\ yz_2 - bz_3 \end{bmatrix}.$$

The modulator equations are $$\dot{x}_1 = (\omega_c + \beta m)(\sigma(x_2 - x_1)) \quad (20)$$
$$\dot{x}_2 = (\omega_c + \beta m)(rx_1 - x_1x_3 - x_2)$$
$$\dot{x}_3 = (\omega_c + \beta m)(x_1x_2 - bx_3)$$

The demodulator 30 has additional nonlinearities added beyond those already present in the dynamical system. These additional nonlinearities appear in the equation for $\xi_1$ as given in (17). Even when K>K* and $Kr(z,\xi_1)$ is removed, a nonlinear equation remains.

The last term, $\beta f(z,y)$, also appears in the observer component 34 of the demodulator 30. Since $\hat{f}(z,y)$ is required by the observer component 34, removing it from the rate estimator 32 does not reduce the total number of nonlinearities present in the demodulator 30. This term is left as it is. The first term, $$(\omega_c + \beta\hat{m})\frac{\partial \hat{f}}{\partial z}\xi_1,$$

is generally nonlinear and does not appear else where in system 30. Approximating this term with a linear, time-invariant system simplifies the hardware implementation of the demodulator 30.

First, if $\omega_c >> \beta\hat{m}$ then $$\dot{\xi}_1 \approx \omega_c \frac{\partial \hat{f}}{\partial z}(z, y)\xi_1 - \beta \hat{f}(z, y). \quad (20)$$

The varying gain matrix, $$\frac{\partial \hat{f}}{\partial z}(z, y),$$

is generally nonlinear. However, the differential equation in (20) is linear with to $\xi_1$ and is a time varying linear filter with $\beta \hat{f}(z,y)$ as its input. Using the notation <•> to denote the filtering operation, $$\xi_1 = -\beta <\hat{f}(z,y)>. \quad (21)$$

Replacing this linear time-varying filter with a linear time-invariant filter makes the equation for $\xi_1$ consists of only linear components and $\hat{f}(x,y)$, the latter of which is already present in the demodulator 30.

The difference between the derivatives of ŷ and y can be approximated as, $$\dot{\hat{y}} - \dot{y} = (\omega_c + \beta \hat{m}) \frac{\partial h}{\partial z}(z) \hat{f}(z, y) - (\omega_c + \beta(\hat{m} - e_m)) \frac{\partial h}{\partial z} \quad (22)$$

$$(z + \xi_1 e_m + \ldots) \hat{f}(z + \xi_1 e_m + \ldots, y) \approx e_m \beta \frac{\partial h}{\partial z}(z) \hat{f}(z, y).$$

Filtering $\hat{y}-\dot{y}$ with the same filter that appears in (21) results in $$\langle \dot{\hat{y}} - \dot{y} \rangle \approx \beta \left\langle \frac{\partial h}{\partial z}(z) \hat{f}(z, y) \right\rangle e_m, \quad (23)$$

assuming that $e_m$ varies slowly with respect to the time constant of the filter so that $e_m$ can be moved outside the filtering operation. Combining (21) and (23), the rate estimator 32 becomes $$\dot{\hat{m}} = K\beta \langle \dot{\hat{y}} - \dot{y} \rangle \left\langle \frac{\partial h}{\partial z}(z) \hat{f}(z, y) \right\rangle \quad (24)$$

$$\approx K\beta \left\langle \frac{\partial h}{\partial z}(z) \hat{f}(z, y) \right\rangle^2 (\hat{m} - m).$$

From (24), the rate estimator 32 has the form $$\dot{\hat{m}} \approx -a(t)(\hat{m}-m), \quad (25)$$

where a(t) is positive semi-definite function, which suggests $\hat{m}$ converge to m.

Figure 4:
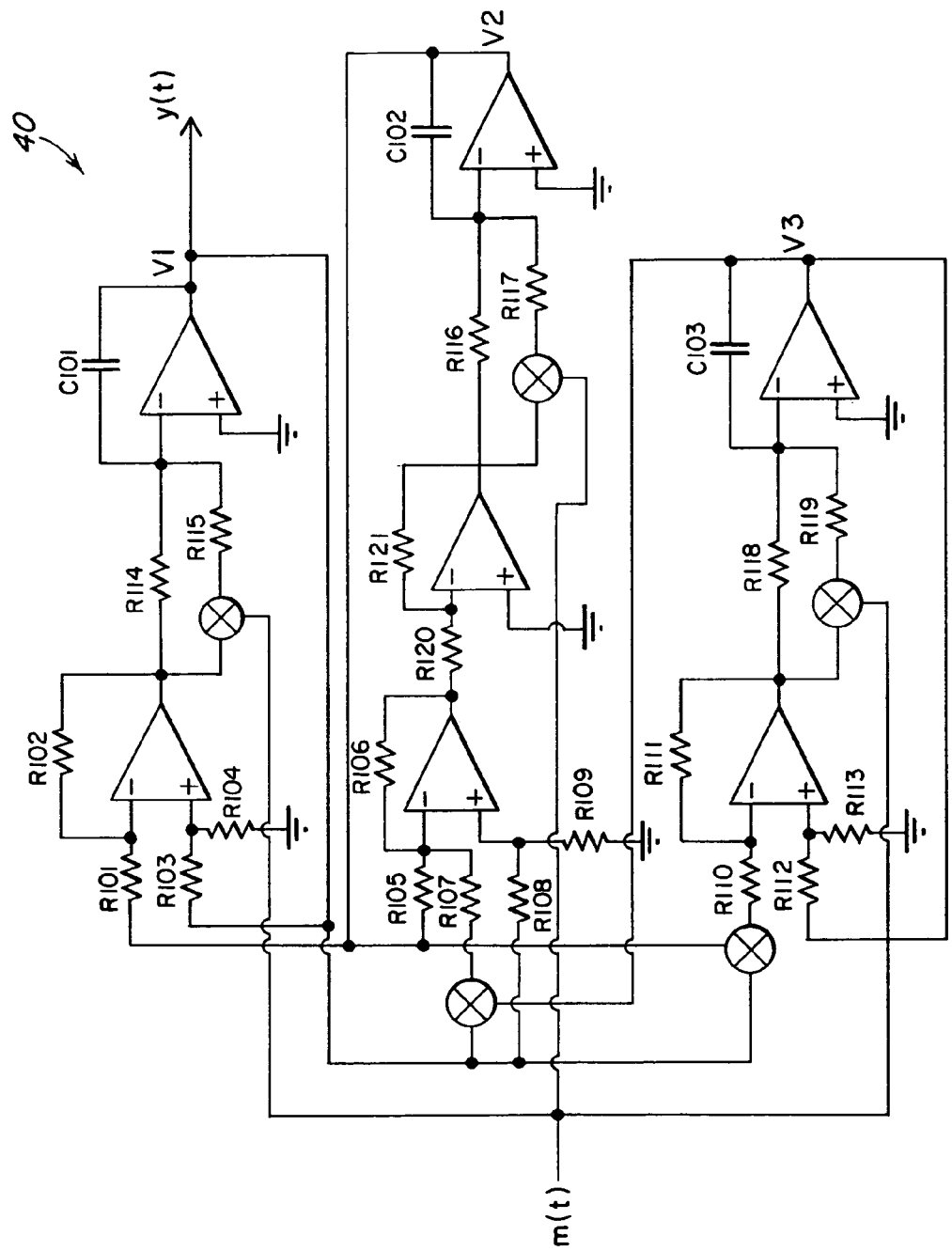
FIG. 4 is a schematic of an exemplary modulator circuit 40.

FIG. 4 is a schematic of a modulator circuit 40. The modulation/demodulation technique of the invention is applicable to any non-linear system meeting the requirements described in the previous section, a particular implementation which uses a set of equations known as the Lorenz equations is further described below. The Lorenz equations are a set of non-linear ordinary differential equations that have state trajectories that behave chaotically. A signal that is chaotic is one that exhibits long-term aperiodic behavior that has a sensitive dependence on initial conditions.

The Lorenz equations discussed above are repeated here for the circuit. In this circuit implementation, however, care must be given to ensure that the signal levels remain within the operating range of the circuit components. Thus, $$X_1 = \frac{1}{2}x_1, X_2 = \frac{1}{2}x_2, \text{ and } X_3 = \frac{2}{9}x_3.$$

The rescaled Lorenz equations implemented are $$\dot{X}_1 = (\omega_c + \beta m)(\sigma(X_2 - X_1)) \quad (26)$$

$$\dot{X}_2 = (\omega_c + \beta m)\left(rX_1 - \frac{9}{2}X_1X_3 - X_2\right)$$

$$\dot{X}_3 = (\omega_c + \beta m)\left(\frac{8}{9}X_1X_2 - bX_3\right).$$

The implementation of this modulator 40 using multipliers, operational amplifiers and capacitors, and resistors is shown in FIG. 4. Solving for the circuit voltage gives $$\dot{V}_1 = \frac{1}{C_{101}}\left(\frac{1}{R_{114}} + \frac{m(t)}{10R_{115}}\right)\left(\frac{R_{102}}{R_{101}}V_2 - \left(\frac{R_{104}}{R_{103}+R_{104}}\right)\left(1 + \frac{R_{102}}{R_{101}}\right)V_1\right)$$

$$\dot{V}_2 = \frac{1}{C_{102}}\left\{\frac{1}{R_{116}} + \frac{m(t)}{10R_{117}}\right\}\frac{R_{121}}{R_{120}}\left\{-\frac{R_{106}}{10R_{107}}V_1V_3 - \frac{R_{106}}{R_{105}}V_2 + \right.$$
$$\left.\left(\frac{R_{109}}{R_{108}+R_{109}}\right)\left(1 + \frac{R_{106}}{R_{105}} + \frac{R_{106}}{R_{107}}\right)V_1\right\}$$

$$\dot{V}_3 = \frac{1}{C_{103}}\left\{\frac{1}{R_{118}} + \frac{m(t)}{10R_{119}}\right\}\left\{\left(\frac{R_{113}}{R_{112}+R_{113}}\right)\right.$$
$$\left.\left(1 + \frac{R_{111}}{R_{110}}\right)V_3 - \frac{R_{111}}{10R_{110}}V_1V_2\right\}.$$

It is assumed that the output of the multipliers is the product of its input divided by 10, which is typical of multiplier circuits. The nominal rates at which the modulator circuit 40 modulates are governed by the capacitors.

Figure 5:
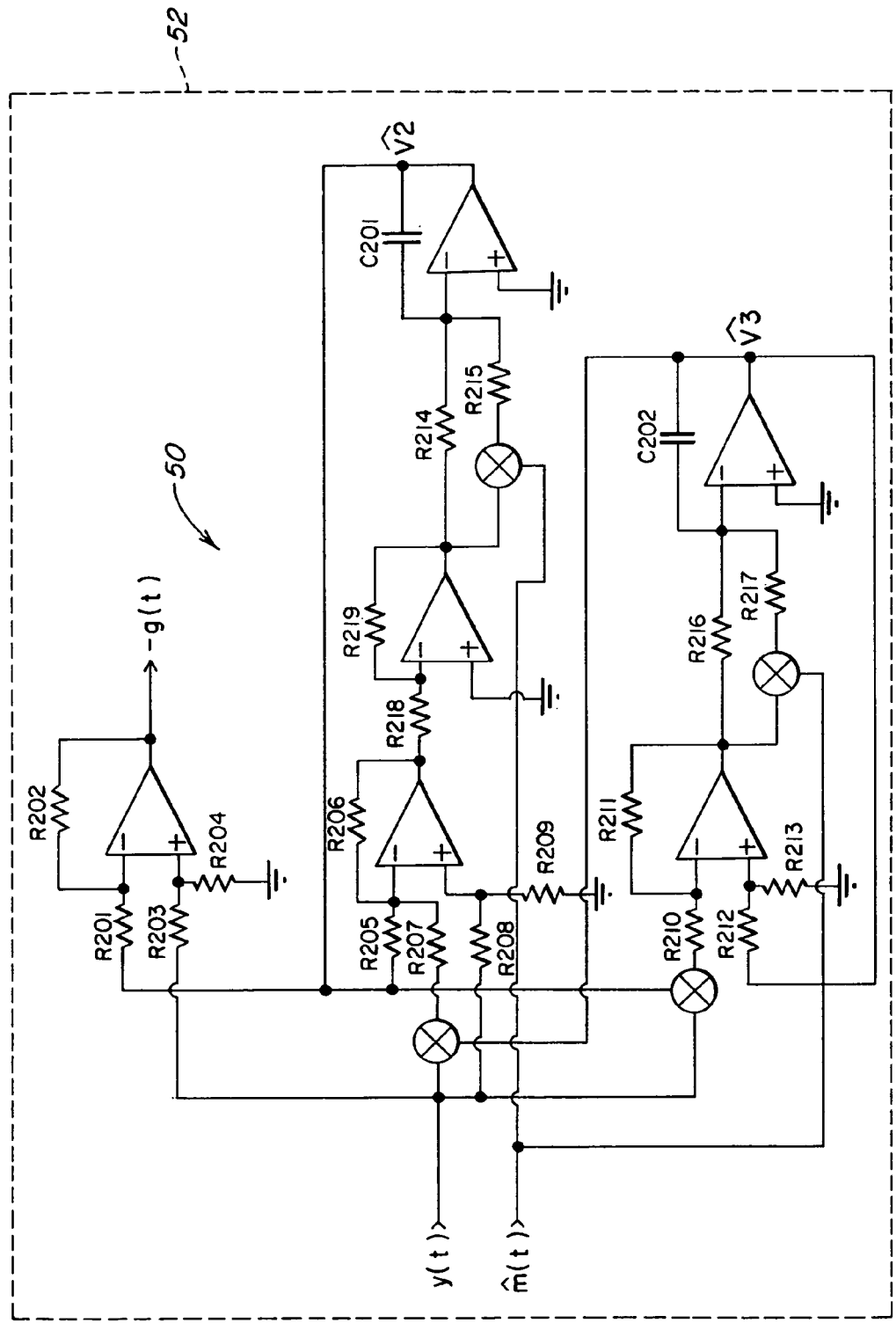
FIG. 5 is a schematic of the observer component 50 of the exemplary demodulator circuit 52.

FIG. 5 is a schematic of the observer component 50 of demodulator 52. After solving the circuit voltages in the observer portion of the demodulator gives $$\dot{\hat{V}}_2 = \frac{1}{C_{201}}\left\{\frac{1}{R_{208}} + \frac{m(t)}{10R_{209}}\right\}\frac{R_{207}}{R_{206}}\left\{-\frac{R_{202}}{10R_{203}}yV_3 - \frac{R_{202}}{R_{201}}V_2 + \right. \quad (1)$$
$$\left.\left(\frac{R_{205}}{R_{204}+R_{205}}\right)\left(1 + \frac{R_{202}}{R_{201}} + \frac{R_{202}}{R_{203}}\right)y\right\}$$

$$\dot{\hat{V}}_3 = \frac{1}{C_{202}}\left\{\frac{1}{R_{214}} + \frac{m(t)}{10R_{215}}\right\}\left\{\left(\frac{R_{213}}{R_{212}+R_{213}}\right)\right.$$
$$\left.\left(1 + \frac{R_{211}}{R_{210}}\right)V_3 - \frac{R_{211}}{10R_{210}}\right\},$$

where $y=V_1$.

Figure 6:
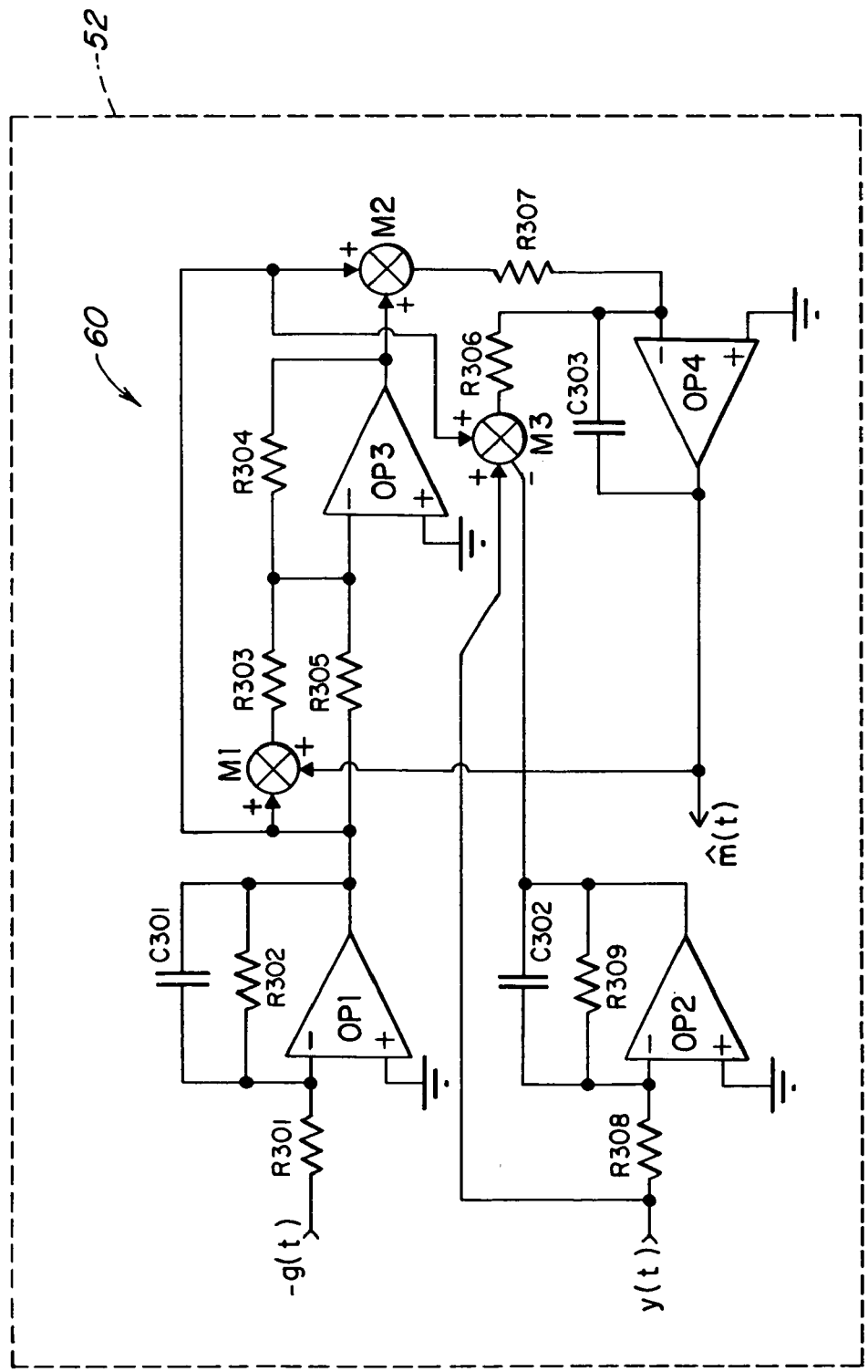
FIG. 6 is a schematic of the rate estimator component 60 of the exemplary demodulator circuit 52.

FIG. 6 is a schematic of the rate estimator component 60 of demodulator circuit 52. After solving the circuit voltages in the rate estimator 60 portion of the demodulator gives $$\dot{\hat{m}} = -\frac{1}{100\,C_{303}} \quad (17)$$

$$\left\{\frac{1}{R_{309}}\left(\frac{R_{304}}{R_{305}} + \frac{R_{304}}{10R_{303}}\hat{m}\right)\langle g \rangle^2 - \frac{1}{\omega_1 R_{308}}\langle y \rangle \langle g \rangle\right\},$$

where $$\omega_L = \frac{1}{R_{309}C_{302}}$$

and <•> denotes the filtering with a first order low pass filter with a cut-off frequency of $\omega_L$. The circuit of FIG. 7 utilizes the multiplier that is particular to the AD374. The AD374 has four inputs. It multiplies the difference between inputs one and two with the difference between inputs three and four. The multiplier M3 multiplies y minus the output of OP2 with the output of OP1.

FIG. 7 is a table illustrating exemplary components of the modulator 40 and demodulator circuits 50 and 60. The components values are illustrative of the circuits described in FIGS. 5, 6, and 7. Based upon these component values $$\omega_c = 400,000$$
$$\beta = 80,000 \quad (18)$$
$$\omega_L = 80,000.$$

However, the modulator and demodulator circuits 40, 50, and 60 may utilize other component values.

The goal of the invention is to describe and analyze a class of signals that can be used in the framework of the modulation technique described above, which is referred to as a generalized frequency modulation. The invention has various practical application which are low power communication system, because the modulation technique is applicable to nonlinear dynamical systems, thus the system is not constrained to operate circuit components in their linear regime. This potentially reduces the number of circuit components, simplifies the circuit, and increases the efficiency. Another is the Spread-Spectrum communication system, which the modulation technique of the invention can be applied to chaotic systems, which are naturally spread-spectrum signals. Due to sensitive dependence on initial conditions exhibited in chaotic systems, chaotic signals are difficult to track without precise knowledge of all of the parameters of the chaotic dynamical system, which suggests that chaotic carrier signals may be advantageous in the context of private communications.

Although the invention has been shown and described with respect to several preferred embodiments thereof, various changes, omissions and additions to the form and detail thereof, may be made therein, without departing from the spirit and scope of the invention.

What is claimed is:

1. A method of modulating a carrier signal generated by a non-linear dynamical system by embedding an information signal into said carrier signal, said method comprises:
   multiplying the said information signal by a constant to produce a first signal value;
   adding the first signal value and the nominal rate of evolution of the dynamical system to generate a second signal value;
   providing a feedback path that includes that a first and second path, wherein input to said first path is the integration of a multiplication of said second signal and output of said second path, and the input to said second path is output of said first path, such that said second path is a first function that defines said non-linear dynamical system; and
   providing said output of said first path as input to a second function that produces a transmitted signal, wherein said a non-linear dynamical system includes an attractor that is either periodic, almost periodic, quasi-periodic, or chaotic.

2. The method of claim 1, wherein said non-linear system has a known exponentially convergent observer.

3. The method of claim 2, wherein said first function has a periodic attractor.

4. The method of claim 2, wherein said first function has quasi-periodic attractor.

5. The method of claim 2, wherein said first function has a chaotic attractor.

6. A system for demodulating a transmitted signal, said system comprising:
   an observer component that receives as input a transmitted signal and a rate estimate and produces an estimate of a state of a demodulator, such that said observer is exponentially convergent to the transmitter state when there is no modulation present in a modulator associated with said transmitted signal; and
   a rate estimator that receives as input the transmitted signal and estimate of a state of said demodulator to produce an estimate of the modulating signal, wherein said observer component and rate estimator are interconnected in a feedback arrangement, such that said arrangement recovers an information signal associated with said transmitted signal.

7. A method of demodulating a transmitted signal, said method comprising:
   receiving as input a transmitted signal and a rate estimate;
   producing an estimate of a state of a demodulator; and
   utilizing said transmitted signal and said estimate of said state of said demodulator to produce said rate estimate, such that an information signal associated with said transmitted is recovered.

8. A method of modulating data comprising:
   providing a non-linear dynamical system with an attractor that is either periodic, almost periodic, quasi-periodic, or chaotic;
   modulating the rate of the evolution of the state on the attractor; and
   transmitting a scalar function of state variables of the modulated non-linear dynamical system.

9. A system for demodulating a transmitted signal, said system comprising:
   an observer component that receives as input a transmitted signal and a rate estimate and produces an estimate of a state of a demodulator, such that said observer component converges exponentially when no modulating signal is present in a modulator associated with said transmitted signal,
   a rate estimator that receives as input the transmitted signal and estimate of said state of said demodulator to produce said rate estimate, and
   a low-pass filter that receives said rate estimate and removes spectral energy that lies in a predefined frequency range from said rate estimate, wherein said observer component and rate estimator are interconnected in a feedback arrangement, wherein said low pass filter is interconnected between said observer component and rate estimator, such that said arrangement recovers an information signal associated with said transmitted signal.

* * * * *